United States Patent [19]
Ono

[11] 3,718,077
[45] Feb. 27, 1973

[54] TRANSISTORIZED CONTROL DEVICE FOR CAMERA SHUTTERS INCLUDING EXPOSURE SETTING AND SHUTTER DELAY TIMING MEANS

[72] Inventor: Shigeo Ono, Tokyo, Japan
[73] Assignee: Nippon Kogaku K.K., Tokyo, Japan
[22] Filed: Nov. 24, 1969
[21] Appl. No.: 872,476

Related U.S. Application Data

[63] Continuation of Ser. No. 536,917, March 3, 1966, abandoned.

[30] Foreign Application Priority Data

March 31, 1965 Japan ..................... 40/18832

[52] U.S. Cl. ............. 95/10 CT, 95/53 EA, 95/53.3
[51] Int. Cl. ......................... G03b 7/08, G03b 9/64
[58] Field of Search......317/124; 95/53.3, 53 EB, 53 EA

[56] References Cited

UNITED STATES PATENTS

| | | |
|---|---|---|
| 3,450,015 | 6/1969 | Reimann et al.........95/53.3 X |
| 3,513,761 | 5/1970 | Kiper......................95/53 EB |

*Primary Examiner*—Samuel S. Matthews
*Assistant Examiner*—Russell E. Adams, Jr.
*Attorney*—Anton J. Wille

[57] ABSTRACT

An apparatus for electronic exposure control in photographic cameras in which both the exposure time and the duration of a delayed action, which can be switched on as desired, are electronically controlled. A single capacitor is used for both delay timing networks and a single electromagnet serves as the stopping control. Current flows from a source only when the shutter button is released.

7 Claims, 11 Drawing Figures

TRANSISTORIZED CONTROL DEVICE FOR CAMERA SHUTTERS INCLUDING EXPOSURE SETTING AND SHUTTER DELAY TIMING MEANS

This is a continuation of application Ser. No. 536,917, filed Feb. 3, 1966 now abandoned.

The present invention relates to an electrical control circuit for timing the operation of a camera shutter which may be used as a shutter delay timer.

There have been known conventional methods according to which the exposure time of a shutter is determined by making use of the charging time of a condenser. Most of the conventional methods are such that the circuit is closed while the button is being pushed. Therefore, the conventional methods have the drawback that when exposure time is short, electric power is wasted uselessly. In the event the exposure time is long, the desired exposure time can not be obtained when the button is released too quickly. In the case where the electric circuit for controlling exposure time is also to be utilized for shutter delay timer, the conventional devices of the type wherein the circuit is opened when the button is released is not desirable.

The object of the present invention is to provide a shutter control circuit for determining the exposure time of a camera by making use of the charging time of condenser.

Another object of the present invention is to provide a shutter delay timer according to which the time delay provided by the electric circuit is utilized, and at the same time the timing circuit, which causes the said time delay, is utilized for determining the interval of exposure of the shutter.

Another object of the present invention is to provide a degree of freedom in design by replacing the conventional shutter delay timer by an electrical circuit thereby minimizing the size of a camera when compared with a camera equipped with a mechanical shutter delay timer. The minimization of parts as herein provided also provides additional space within a camera body into which other mechanisms may be disposed. According to the present invention troubles caused by the lack of lubrication or wearing are almost eliminated. Therefore the device of the present invention can be used almost indefinitely.

According to the present invention, the condenser is first charged by means of a resistance for shutter delay timer, and the charging time required for bringing the potential up to a predetermined value is utilized as shutter delay timer. Then the condenser is charged again through a photo-conductive body or variable resistance, which controls the exposure time of the shutter.

The present invention is explained in more detail by referring to the embodiment shown in the attached drawings in which.

Figure 1:
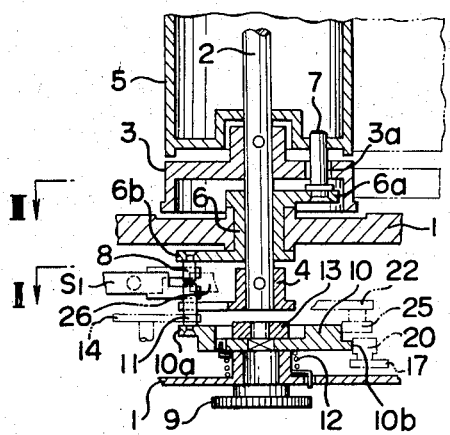
FIG. 1 is a cross sectional view of the shutter winding take-up gear and the shutter drum of a camera illustrating the cooperating circuit controlling elements embodying the invention.

Referring to the attached drawings, 1 is a camera body, 2 is a drum shaft of a conventional focal plane shutter, 3 is the pulley for the leading section of the shutter screen fixed on the drum shaft of the focal plane shutter. On a part thereof is formed an arcuate groove 3a for receiving with some clearance a connecting pin 7. A detent or starting member 4 for the leading portion of the shutter screen is secured to the lower end of the drum shaft 2. A drum 5 for the trailing section of the shutter screen is rotatably mounted on the drum shaft 2. An intermediate member 6 is rotatably mounted on the camera body 1, and serves as a bearing for the drum shaft 2. The connecting pin, previously referred to, is fixed on the upper side of an upper arm 6a of the intermediate member 6, and is connected to the drum 5 for the trailing section of the shutter screen through the arcuate slot 3a. The pin 7 abuts the end of slot 3a when the shutter is charged to prevent return of the shutter. A dependent pin 8, or starting member for the trailing portion of the screen as it will hereinafter be referred to, is fixed in the underside of a lower arm 6b of intermediate member 6 and is adapted to engage the lower contact piece of the first switch $S_1$ which is described hereinafter.

Figure 2:
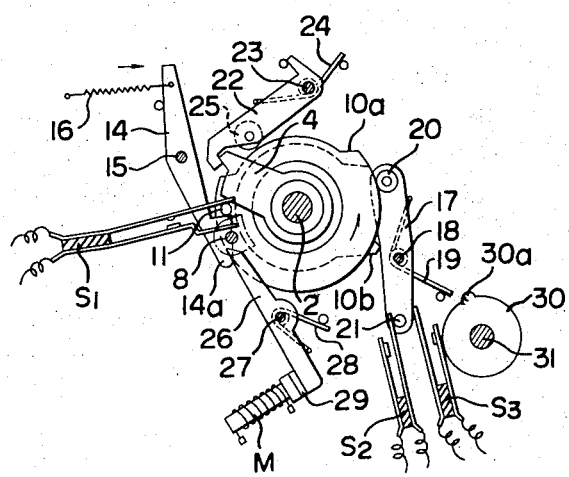
FIGS. 2 and 3 are plan views of the controlling elements as viewed along lines II and III respectively of FIG. 1.

A take-up gear 9 is rotatably mounted on the body 1, and is connected to a conventional shutter winding mechanism (not shown). A control cam 10, secured as by nut 13, to the take-up gear and rotatable therewith, is formed with upper and lower peripheral cam surfaces 10a and 10b respectively. A take-up pin 11 is secured in the upper surface of the control cam 10, and is adapted to engage the resilient upper contact piece of the first switch $S_1$ and a release lever 14 pivotally supported on a pin 15. A spring 12 biases the gear 9 and cam 10 in a counterclockwise direction (FIG. 2). The release lever 14 is provided with a hooked portion 14a at one end (FIG. 4) and is biased in a counterclockwise direction by a spring 16. The release lever is adapted to be rotated in the direction of the arrow in FIG. 4 by means of conventional device at the time of shutter release. Element 17 is a switch lever rotatably supported by a pin 18 and is biased by a spring 19 in a counterclockwise direction. Secured in the respective ends of the switch lever 17 are a roller 20, adapted to engage the lower cam surface 10b of the control cam, and an insulated pin 21 for engaging a second switch $S_2$ and a third switch $S_3$ (FIG. 2). A stop lever 22 for the leading section of the shutter screen is supported rotatably by the shaft 23, and is biased so as to rotate in a counterclockwise direction by means of a spring 24. An eccentrically mounted pin 25 is mounted on the lever 22 and is adapted to ride over the cam surface 10a of the control cam, the angular disposition of the lever 22 being adjustable by rotation and securing of the pin 25. A stop lever 26 is provided for the trailing section of the shutter screen and is adapted to engage both the dependent pin 8 and the pin 1. The stop lever 26 is rotatably supported on a pin 27 and biased by a spring 28 to rotate in the clockwise direction.

One end of the stop-lever 26 is formed as an inclined surface, while the other end is provided with an armature member 29 (FIG. 2) cooperating with an electromagnet M. As will hereinafter appear, when the electromagnet is deenergized, the inclined surface on the end of lever 26 is engaged by the starting pin 8 and the cam pin 11 to pivot the lever counterclockwise against the bias of the spring 28. 30 is the lock member having the projection 30a on the periphery thereof, and is supported by the pin 31. When the projection 30a is contacted against the third switch $S_3$, the switch $S_3$ is closed.

Figure 4:
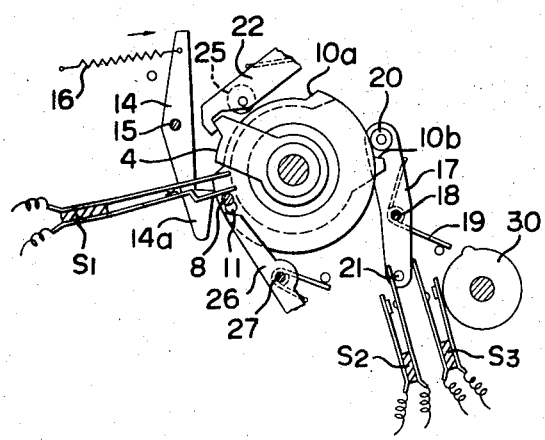
FIGS. 4 through 8 are detail plan views illustrating the operational changes in the positions of the controlling elements.
Figure 5:
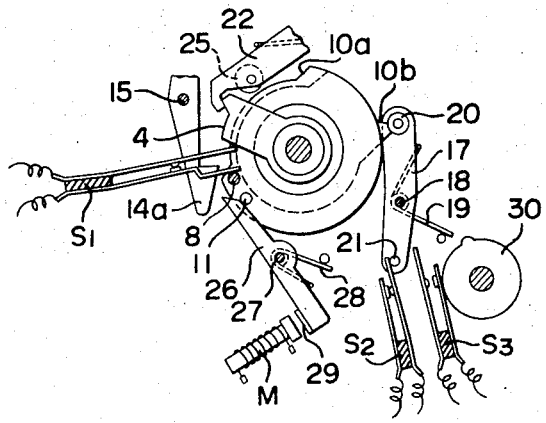
Figure 3:
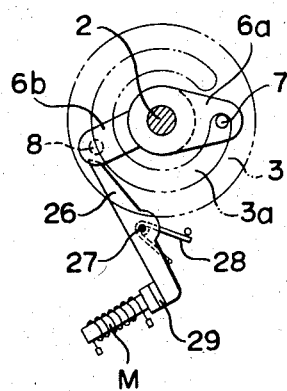
Figure 6:
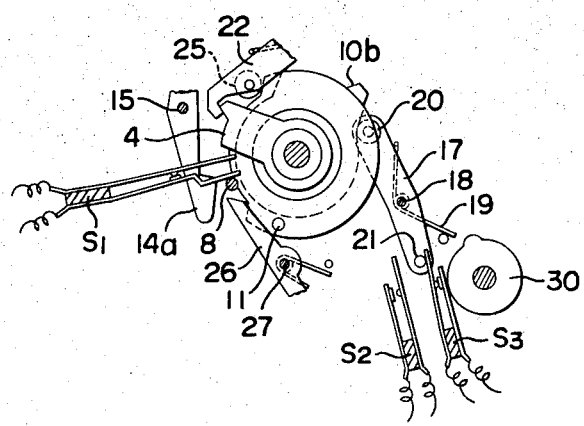
Figure 11:
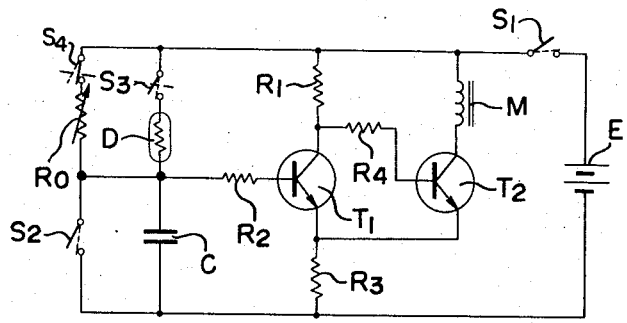
FIG. 11 is a schematic circuit diagram embodying the present invention.

FIG. 11 shows the main circuit of the present invention embodiment. In the figure, C is condenser, D is a photo-conductive body such as Cds cells, E is a battery, M is a magnet, and $S_1$ is the first switch. Considering for the moment the operation of the first switch $S_1$, when the camera shutter is charged, the take-up pin 11 on the control cam and the starting pin 8 press the upper and lower contact pieces so as to bend the contact pieces relatively upwards as shown in FIG. 2 to maintain the switch $S_1$ open. When the take up pin 11 is moved upon rotation of the cam, the upper contact piece is released to close the switch $S_1$ as illustrated in FIGS. 4 to 6. When the take up pin 11 and the starting pin 8 for the trailing section of the screen are rotated together, the upper and lower contact pieces are returned to the released positions and the switch $S_1$ is open as illustrated by the dotted line of FIG. 7.

Referring again to FIG. 11, $S_2$ and $S_3$ are respectively the second and the third switches, $T_1$ and $T_2$ are NPN transistors, and $R_0$ is the delay resistance for the shutter delay timer. The resistance value of $R_0$ is considerably higher than resistances $R_1$ to $R_4$.

With the structure and arrangement of elements hereinbefore described, should the camera shutter be charged and the take-up gear 9 rotated, the take up pin 11 and the starting pin 8 for the trailing section of the screen are rotated to the positions as shown in FIG. 2 to open the first switch $S_1$. Then, at the time of shutter release, 11 is released by the pivoting of the release lever 14 in the direction as shown by the arrow, the control cam 10 starts to rotate in the counter-clockwise direction by the force of the spring 12, and therefore the upper contact piece of the first switch $S_1$ and the take up pin 11 are separated. The said first switch $S_1$ is then closed to energize the magnet M. Since the second switch $S_2$ and the third switch $S_3$ are opened the condenser C is charged through the delay resistance $R_0$. The rotation of the control cam 10 comes to a stop at the position where the take up pin 11 is engaged by the inclined surface of the stop lever of the trailing section of the membrane 28. (see FIG. 4) The charging time of the condenser C can be sufficiently prolonged by increasing the value of the delay resistance $R_0$, since this represents the time delay function of the shutter delay timer.

When the predetermined time has elapsed, and the potential of the condenser C is raised, the signal current is passed through the transistor $T_1$, and T, conducts. The emitter potential of the transistor $T_2$ is increased and the base potential is lowered, so that transistor $T_2$ is abruptly cut off to deenergize the magnet M. The take up pin 11 which has engaged the inclined surface of the stop lever 26 is pushed over the stop lever 26 and the control cam 10 which has been stationary, starts to rotate again. The lower cam 10b rotates the switch lever 17 in a clockwise direction through the roller 20 to close the second switch $S_2$ as shown in FIG. 5, and therefore the potential within the condenser C is discharged and reduced to zero again. In other words, the base of the transistor $T_1$ is grounded and therefore electric current again passes through the magnet circuit M to attract the stop lever 26 for the trailing section of the screen. Thus, the third switch $S_3$ conducts as soon as $S_2$ is opened at the position where one end of the switch lever 17 fails into the lowest portion of the lower cam 10b, and therefore, the condenser C is again charged through the photo conductive body D. The time required for this charging is determined by the resistance value of the photo conductive body D, in other words, by the brightness of the object since the capacity of the condenser C can be determined by taking into consideration the changes of the resistance of the photo conductive body D in advance, the appropriate exposure relative to the brightness of the object can be automatically obtained.

Figure 7:
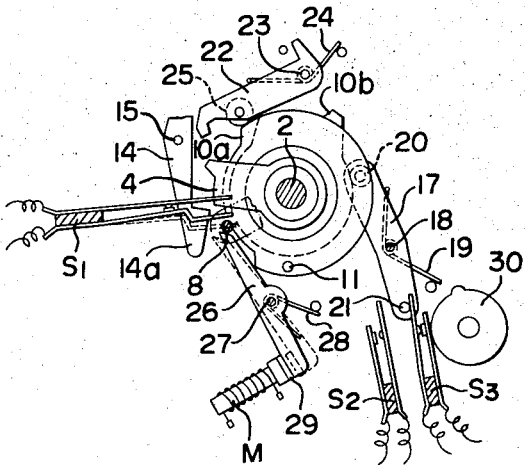
Figure 8:
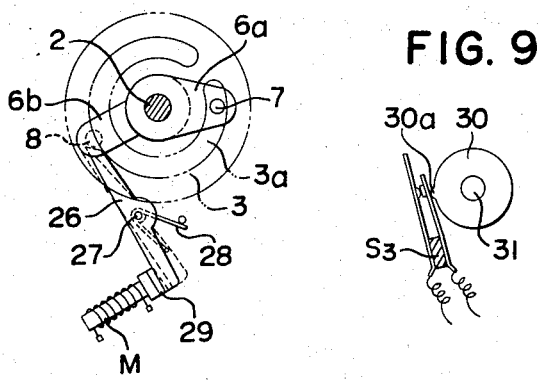

The rotation of the control cam 10 pushes up the stop lever 22 of the leading section of the screen through the eccentric pin 25 by means of the upper cam 10a as shown in FIG. 7. However, the order of the series of the operation is selected by the design of the shutter, and it is changeable by the correction of the delay of the operation of magnet.

Therefore, the fitting of starting member 4 of the leading section of the shutter screen is released, and the leading section of the pulley 3 starts rotating in the counter clockwise direction, and the exposure is started. The trailing section of the drum 5 starts rotation slightly accompanied with the rotation of the leading section of the pulley 3, but since the starting pin 8 of the trailing section of the screen is prevented on the inclined surface of the stop lever 26 of the trailing section of the screen, the drum 5 for the trailing section of the screen is held at the said position.

When the potential of the condenser C is elevated up to the predetermined value, the transistor $T_1$ becomes conductive and the transistor $T_2$ turns off to eliminate the energization of the magnet M, and therefore the starting pin 8 which has been stopped on the inclined surface of the stop lever 26 of the trailing section of the shutter screen finishes the exposure operation by rotating while pushing up the lever 26. At this time, the lower contact piece of the first switch $S_1$ is returned to the released position (the dotted line in FIG. 7), and therefore the switch $S_1$ is now open and opens the electric circuit.

Figure 10:
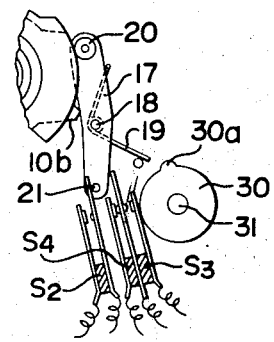
FIG. 10 is a plan view of a modified embodiment in which a fourth switch may be provided.

As a matter of fact, it is possible to optionally select the delay time of the shutter delay timer by making the delay resistance $R_0$ into variable resistance, and as shown in FIGS. 10 and 11, the fourth switch $S_4$ may be provided on the side of the delay resistance $R_0$, so as to be interlocked to the switching operation of the third switch $S_3$.

Figure 9:
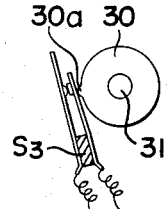
FIG. 9 illustrates the closed condition of a third switch $S_3$.

Next, in case the shutter delay timer is not employed, the lock member 30 is rotated as shown in FIG. 9 to keep the third switch $S_3$ always closed.

It also may be designed so as to manually determine the predetermined exposure value by providing variable resistance in place of the photo conductive body D.

Having thus described my invention it will be obvious to those skilled in the art that while the invention has been described in connection with a slit or focal plane shutter, the invention is equally applicable to a lens shutter.

What is claimed is:

1. In a photographic camera, an improvement comprising:
   a shutter charging mechanism;
   shutter drive means mounted for movement from an uncocked to a cocked position by the shutter charging mechanism, and for subsequent movement from said cocked to said uncocked position, and having a cam surface thereon;
   shutter release means for releasably holding said drive means in said cocked position;
   shutter opening means driven by said shutter drive means upon release of said drive means from said cocked position;
   shutter closing means driven by the shutter drive means;
   locking lever means cooperating with said cam surface for releasably holding said shutter opening means from being driven during a first interval of movement of said drive means toward said uncocked position, and for permitting movement of said shutter opening means during a subsequent interval of said drive means movement;
   a first stop pin fixed on the shutter drive means;
   a second stop pin fixed on the shutter closing means;
   a pivoted stop lever having first and second ends, said first end having an armature attached thereto and said second end having a blocking surface;
   an electromagnet adapted to cooperate with said armature to pivot the blocking surface of said stop lever into and out of the paths of said first and second stop pins;
   a spring biasing said armature into engagement with said electromagnet;
   transistorized timing circuit means for controlling the energizing of said electromagnet and including a power source, a capacitor, a first resistor connected in series with said capacitor, a photosensitive resistor, means for selectively connecting said photosensitive resistor in series with said capacitor, a normally open first switch connected to said timing circuit means and adapted to be closed upon actuation of said shutter release means to activate said timing circuit means to energize said electromagnet to pivot said stop lever to engage said first stop pin thereby preventing said shutter drive means from operating, said electromagnet deenergizing after a delay time determined by a charging current flowing through said first resistor and said capacitor to allow the stop lever to pivot to an unblocking position and allow the shutter drive means to drive said shutter opening means;
   switch lever means cooperating with the cam surface of the shutter drive means;
   normally open second and third switches connected to the timing circuit means and positioned for operation by the switch lever means, said second switch being closed by the switch lever means to discharge the capacitor upon movement of the shutter drive means after said delay time, and upon further movement of said drive means said second switch being reopened and said third switch being closed to charge the capacitor through said photosensitive resistor, thus energizing said electromagnet again to pivot said stop lever to engage said second stop pin thereby preventing said shutter closing means from operating until a predetermined exposure time has elapsed whereupon the circuit means deenergizes said electromagnet to allow operation of said shutter closing means.

2. A timing circuit according to claim 1, further comprising manually controlled locking means for selectively keeping said third switch closed independently of said switch lever means, a fourth switch connected for switching movement with said third switch, and a variable resistor connectable into the timing circuit means when the fourth switch is closed.

3. In a camera having an exposure aperture, a shutter control device for controlling the passage of incident light through the aperture comprising: in combination, first and second shutter means movable between a closed position covering the aperture and an open position uncovering said aperture, means for urging said first shutter means toward said open position and said second shutter means toward said closed position, first stop means operably related to the first shutter means for stopping it in the closed position, second stop means operably related to the second shutter means for stopping it in the open position, an electronic switch circuit including a single electromagnet cooperating with the first and second stop means for maintaining the first and second stop means in their stopping positions during first and second states of said switch circuit, and further including a first switch for energizing said circuit in said first state thereof in which said electromagnet actuates said first stop means for maintaining the first stop means in a stopping position, means for resetting the circuit after a delay to said second state thereof in which said electromagnet releases said first stop means to free said first shutter means toward its opening position, and a second switch in said circuit for initiating an exposure timing operation, drive means for opening the shutter by causing the first stop means to release the first shutter means, for closing said first switch to energize said circuit in said first state, and for actuating said second switch to initiate the timing operation of said circuit during movement of the drive means from a start position to a rest position, release means for freeing said drive means for movement toward its rest position, and means for opening said first switch according to the movement of said second shutter means.

4. A device according to claim 3, in which said circuit resetting means is a capacitor charging timing network including at least one capacitor and resistor in connection with said electromagnet and the two switches.

5. A camera shutter control device for successively opening and closing the camera shutter, comprising in combination,
   shutter means movable between a closed position covering the camera aperture and an opened position uncovering the aperture for controlling the passage of incident light therethrough, said shutter means including a shutter member for terminating the exposure;
   an electrical timing network including a single capacitor and resistor means;
a single electromagnet controlled by the timing network; and stopping means including,
pivoted lever means having an armature portion cooperating with said electromagnet to hold said lever means in a first direction and an inclined portion cooperating with said shutter member which blocks the closing movement of said member while the electromagnet is energized to attract said armature portion, said shutter member exerting a force on said lever means in an opposite direction, and
spring means biasing said lever means to engage the armature portion thereof with said electromagnet whereby upon the deenergization of said electromagnet said shutter member pushes said lever means and is released.

6. In a photographic camera, an improvement comprising:
a shutter charging mechanism;
shutter drive means actuable by said shutter charging mechanism for being moved from an uncocked to a cocked position and having a cam surface thereon,
shutter release means for releasably holding said drive means in said cocked position, and for releasing said shutter drive means from said cocked position to permit movement of said drive means toward said uncocked position;
shutter opening means driven by said shutter drive means;
shutter closing means driven by the shutter drive means;
locking lever means engageable with said cam surface for releasably holding said shutter opening means from operating, wherein said locking lever means releases said shutter opening means in response a predetermined extent of movement of said drive means;
a first stop pin fixed on the shutter drive means;
a second stop pin fixed on the shutter closing means;
a pivotally mounted stop lever having an armature and having a blocking surface for selective engagement with said first and second stop pins;
electromagnet means mounted adjacent said stop lever for magnetic coupling with said armature to control the pivotal position of said stop lever;
timing circuit means for controlling the energization of said electromagnet means and including a power source, a capacitor, a first timing resistor coupled to said capacitor, a photosensitive resistor, and normally open first switch means for selectively coupling said photosensitive resistor in series with said capacitor;
normally open second switch means connected to said timing circuit means and positioned to be closed upon actuation of said shutter release means to activate said timing circuit means to energize said electromagnet for pivoting said stop lever into a position wherein said blocking surface prevents movement of said first stop pin thereby preventing movement of said shutter drive means, said timing circuit means deenergizing said electromagnet means after a predetermined delay time determined by a charging current flowing through said first timing resistor and said capacitor to allow the stop lever to pivot to an unblocking position thereby permitting said drive means to operate said locking lever means to release said shutter opening means;
normally open third switch means coupled to said timing circuit means;
means for operating said first and third switch means in response to movement of a drive means upon release of said first stop pin wherein said third switch means is closed to discharge said capacitor, where-after said third switch means is opened and said first switch means is closed to charge said capacitor with a current flowing through said photosensitive resistor, wherein said timing circuit reenergizes said electromagnet means to position said blocking surface for blocking engagement with said second pin to releasably hold said shutter closing means until the lapse of a predetermined exposure time determined by the capacitor charging current flowing through said photosensitive resistor, whereafter said timing circuit means deenergizes said electromagnet to release said shutter closing means.

7. In a camera having an exposure aperture, a shutter control device for controlling the passage of incident light through the aperture comprising: in combination, first and second shutter means movable between a closed position covering the aperture and an open position uncovering said aperture, means for urging said first shutter means toward said open position and said second shutter means toward said closed position, first stop means for releasably holding said first shutter means in said closed position, second stop means for releasably holding the second shutter means in said open position, switching circuit means having an electromagnet connected thereto for maintaining the first and second stop means in their stopping positions during a first operation state of said switching circuit, and for maintaining said second stop means in its stopping position during a second operation state of said switching circuit means, said switching circuit means including switch means for operation to energize said circuit means in said first state thereof in which the energization state of said electromagnet controls said first stop means to maintain said first shutter means in said closed position, said switching circuit means including means for controlling said electromagnet to release said first stop means after a first delay time as measured from said operation of said switch means, thereby permitting said first shutter means to move to said open position, means for resetting the circuit means to said second state in which said electromagnet actuates said second stop means to maintain said second shutter means in said open position, and means for controlling said electromagnet to release said second stop means after a second delay time as measured from the time of movement of said first shutter means to said open position, thereby permitting said second shutter means to move to said closed position.

* * * * *